US012750253B2

(12) United States Patent
Jeon et al.

(10) Patent No.: US 12,750,253 B2
(45) Date of Patent: Sep. 29, 2026

(54) SECURITY TERMINAL SYSTEM CAPABLE OF PERFORMING HIGH-SPEED SECURITY PROCESSING

(71) Applicant: RANIX. Inc., Seoul (KR)

(72) Inventors: Jeong Gyu Jeon, Goyang-si (KR); Soung Wook Choi, Seoul (KR)

(73) Assignee: RANIX. Inc., Seoul (KR)

( * ) Notice: Subject to any disclaimer, the term of this patent is extended or adjusted under 35 U.S.C. 154(b) by 0 days.

(21) Appl. No.: 19/342,386

(22) Filed: Sep. 26, 2025

(65) Prior Publication Data

US 2026/0149622 A1 May 28, 2026

(30) Foreign Application Priority Data

Nov. 22, 2024 (KR) ........................ 10-2024-0168687

(51) Int. Cl.
*H04L 12/40* (2006.01)
*H04W 4/40* (2018.01)

(52) U.S. Cl.
CPC .. *H04L 12/40104* (2013.01); *H04L 12/40071* (2013.01); *H04W 4/40* (2018.02)

(58) Field of Classification Search
CPC ......... H04L 12/40104; H04L 12/40071; H04L 9/0877; H04L 2209/12; H04W 4/40; H04W 88/02; G06F 13/4282
See application file for complete search history.

(56) References Cited

U.S. PATENT DOCUMENTS 11,979,509 B2 * 5/2024 Russell ................. H04L 9/3268
2019/0268376 A1 * 8/2019 Park .................... H04L 63/0428
2021/0127362 A1 * 4/2021 Jin ......................... H04W 4/40
2021/0258793 A1 * 8/2021 Rohini .................. H04W 76/14
2023/0042442 A1 * 2/2023 Kim .................... H04L 63/0876
2024/0405790 A1 * 12/2024 Jiang ...................... H04W 4/40

FOREIGN PATENT DOCUMENTS

KR 1020190102873 A 9/2019
KR 102044534 B1 11/2019
KR 1020220111586 A 8/2022
KR 1020240058669 A 5/2024

OTHER PUBLICATIONS

Korean Office Action for Korean Application No. 10-2024-0168687, dated Jan. 15, 2025.
Korean Patent Decision for Korean Application No. 10-2024-0168687, dated Mar. 17, 2025.

* cited by examiner

*Primary Examiner* — Phong H Dang
(74) *Attorney, Agent, or Firm* — Youngil Lee

(57) ABSTRACT

The present invention relates to a security terminal system capable of performing high-speed security processing, particularly relates to the technology about a terminal that performs V2X communication simultaneously with hundreds of external communication devices and a security module that is responsible for communication security of the terminal, and more particularly, to a security terminal system capable of performing high-speed security processing in which a new hardware-based architecture is used to reduce a bottleneck phenomenon occurring in data communication between the terminal and the security module, minimize performance loss of a security module engine, thereby improving speed and efficiency of security operation, and satisfy the existing V2X communication standards.

9 Claims, 8 Drawing Sheets

SECURITY TERMINAL SYSTEM CAPABLE OF PERFORMING HIGH-SPEED SECURITY PROCESSING

CROSS REFERENCE TO RELATED APPLICATION

The present application claims the right of priority to and the benefits of Korean Application No. 10-2024-0168687 having a filing date of Nov. 22, 2024, the content of which is hereby incorporated by reference in its entirety.

BACKGROUND OF THE INVENTION

1. Field of the Invention

The present invention relates to a security terminal system capable of performing high-speed security processing, particularly relates to the technology about a terminal that performs V2X communication simultaneously with hundreds of external communication devices and a security module that is responsible for communication security of the terminal, and more particularly, to a security terminal system capable of performing high-speed security processing in which a new hardware-based architecture is used to reduce a bottleneck phenomenon occurring in data communication between the terminal and the security module, minimize performance loss of a security module engine, thereby improving speed and efficiency of security operation, and satisfy the existing V2X communication standards.

2. Description of the Related Art

A vehicle to everything (V2X) refers to a technology that allows a vehicle to exchange or share information with surrounding vehicles, mobile devices, transportation infrastructure and the like through wired and wireless communication networks, in other words, refers to a communication system between a vehicle and all road environments that may affect vehicle operation, and includes vehicle-to-vehicle (V2V; communication between vehicles), vehicle-to-infrastructure (V2I; communication between vehicle and infrastructure), vehicle-to-pedestrian (V2P; communication between vehicle and pedestrians), and vehicle-to-network (V2N; communication between vehicle and networks). The V2X technology can exhibit various effects, for example, of performing real-time information exchange to significantly improve accident prevention and driving safety, optimizing traffic flow to reduce traffic congestion, and facilitating efficient traveling to allow environmentally friendly driving.

The institute of electrical and electronics engineers (IEEE) standardized a wireless LAN-based WAVE (IEEE802.11p) as a communication standard related to V2X in 2016. Thereafter, the standardization, development and verification of various V2X communication technologies having improved performance and compatible with 802.11p, such as next generation V2X (NGV; IEEE802.11bd), or LTE-V2X (3GPP Rel. 14) and 5G-NR-V2X (3GPP Rel. 16) of the 3GPP mobile communication series, have been actively carried out, and communication standards, such as IEEE1609, related to V2X communication security also have been proposed.

Meanwhile, in the era of autonomous driving, vehicles or terminals may communicate with hundreds of nearby V2X devices at places such as intersections. At this moment, because thousands of security messages and certificates are needed to be processed, and any delay or error in the processing process may pose a risk to vehicles, pedestrians, facilities and the like, high-speed/high-performance security processing capabilities are essentially required.

However, although the development of high-performance V2X communication technology is still active in the market, the additional high-speed security processing technology is still insufficient. Thus, the efficiency of security processing has been declining because unsecured software is directly handled, existing security chips failed in satisfying communication standards are used, or only the security computation engine is improved without improving service performance. Accordingly, there is a need for technology capable of improving the above problems and performing security processing at high speed.

SUMMARY OF THE INVENTION

An object of the present invention is to provide a security terminal system capable of performing high-speed security processing, particularly relates to the technology about a terminal that performs V2X communication simultaneously with hundreds of external communication devices and a security module that is responsible for communication security of the terminal, and more particularly, to a security terminal system capable of performing high-speed security processing in which a new hardware-based architecture is used to reduce a bottleneck phenomenon occurring in data communication between the terminal and the security module, minimize performance loss of a security module engine, thereby improving speed and efficiency of security operation, and satisfy the existing V2X communication standards.

In order to solve the above problem, one embodiment of the present invention provides a security terminal system installed inside a vehicle to perform high-speed security processing required for V2X communication, and the security terminal system includes: an RF module for performing wireless communication with an outside; a modem for modulating/demodulating data to be transmitted and received through the RF module; an AP connected to the modem to process processes related to transmission and reception and security of the data used for the V2X communication; a first encryption processing module for performing a first security operation on a data packet received from the AP through serial communication scheme to transmit the data packet to the AP; and a second encryption processing module including one or more processors and one or more memories and performing a second security operation that is not performed by the first encryption processing module on the received data packet, wherein the first encryption processing module includes: a first encryption engine unit including a plurality of encryption engines for performing the first security operation on the received data packet according to each encryption algorithm; and a command processing unit for interpreting a request received from the first encryption processing module, inputting the request to a related encryption engine based on an interpretation result, and generating a response packet based on an execution result of the first security operation performed by the encryption engine, wherein the encryption engines and the command processing unit are implemented in hardware.

In one embodiment of the present invention, the AP may include: a serial communication packet transmission unit for transmitting a data packet to be performed through the first security operation or the second security operation to the first encryption processing module; and a serial communication packet reception unit for receiving a data packet having been performed through the first security operation or the second security operation from the first encryption processing module, wherein the first encryption processing module may further include: a first Rx unit for receiving the data packet to be performed through the first security operation from the serial communication packet transmission unit and transmitting the data packet to the command processing unit; and a first Tx unit for receiving the data packet having been performed through the first security operation from the command processing unit and transmitting the data packet to the serial communication packet transmission unit, wherein the serial communication packet transmission unit and the first Rx unit may communicate through a first serial communication cable, in which the first serial communication cable may only support communication in a direction from the AP to the first encryption processing module, and the serial communication packet reception unit and the 1 Tx unit may communicate through a second serial communication cable, in which the second serial communication cable may only support communication in a direction from the first encryption processing module to the AP.

In one embodiment of the present invention, the first encryption processing module may further include: a second Rx unit for receiving the data packet from a bus line of the second encryption processing module to transmit the received data packet to the command processing unit; and a second Tx unit for receiving the data packet from the command processing unit to transmit the received data packet to the bus line of the second encryption processing module; the bus line may directly communicate with the one or more processors, the one or more memories, and a plurality of second encryption engines of the second encryption processing module.

In one embodiment of the present invention, the security terminal system may perform a first security step, and the first security step may include: a step, in the AP, of transmitting a data packet to be performed through the first security operation to the first encryption processing module through a first serial communication cable; a step, in the command processing unit, of receiving a data packet transmitted from the AP, decoding the received data packet, and then allocating encryption engines for performing the first security operation on the data packet based on a decoding result; a step, in the allocated encryption engine, of performing the first security operation on the data packet; and a step, in the command processing unit, of receiving the data having been performed through the first security operation from the allocated encryption engine and transmitting the received data to the AP.

In one embodiment of the present invention, header information of the data packet transmitted from the AP may include identification information for allowing the first security operation of the data packet to be performed in the first encryption processing module, and the command processing unit that receives the data packet including the identification information may perform the first security operation only in the first encryption processing module without transmitting the data packet to the second encryption processing module.

In one embodiment of the present invention, the security terminal system may perform a second security step, and the second security step may include: a step, in the AP, of transmitting a data packet to be performed through the second security operation to the first encryption processing module through a second serial communication cable; a step, in the command processing unit, of transmitting the received data packet to the second encryption processing module; a step, in the second encryption processing module, of receiving a data packet, decoding the data packet received in a processor unit including one or more processors and one or more memories, and then allocating encryption engines for performing a second security operation on the data packet based on a decoding result; a step, in the allocated encryption engine, of performing the second security operation on the data packet; and a step, in the second encryption processing module, of transmitting the data packet having been performed through the second security operation to the AP.

In one embodiment of the present invention, header information of the data packet transmitted from the AP may include identification information for allowing the second security operation of the data packet to be performed in the second encryption processing module, the command processing unit that receives the data packet including the identification information may not transmit the data packet to the first encryption engine unit, and the second encryption processing module may perform the second security operation on the data packet in a second encryption engine unit included in the second encryption processing module.

In one embodiment of the present invention, the security terminal system may perform a third security step, and the third security step may include: a step, in the second encryption processing module, of transmitting a data packet to be performed through the first security operation to the first encryption processing module; a step, in the command processing unit, of receiving a data packet transmitted from the second encryption processing module, decoding the received data packet, and then allocating encryption engines for performing the first security operation on the data packet based on a decoding result; a step, in the allocated encryption engine, of performing the first security operation on the data packet; and a step, in the command processing unit, of receiving the data having been performed through the first security operation from the allocated encryption engine and transmitting the received data to the AP or the second encryption processing module.

In one embodiment of the present invention, the second encryption processing module may further include: a second encryption engine unit including a plurality of encryption engines for performing the second security operation on the received data packet according to each encryption algorithm.

According to one embodiment of the present invention, service performance loss occurring in data communication between the security terminal and the security module performing V2X communication may be minimized, so that high-speed response and security can be ensured.

According to one embodiment of the present invention, stream communication may be implemented, so that waiting delay for requests or responses can be eliminated.

According to one embodiment of the present invention, next-generation V2X communication standards can be satisfied.

According to one embodiment of the present invention, unnecessary high-performance engines or processors may not be used by increasing the efficiency of the security module, so that high service performance can be implemented at low cost.

According to one embodiment of the present invention, security processing may be performed at high speed, so that security for moving objects such as vehicles or pedestrians can be increased.

According to one embodiment of the present invention, continuous data communication may be performed by introducing a dedicated Rx/Tx serial communication technology, so that data communication faster than the conventional SPI communication or serial communication technology can be facilitated.

DETAILED DESCRIPTION OF THE INVENTION

Hereinafter, various embodiments and/or aspects will be described with reference to the drawings. In the following description, a plurality of specific details are set forth to provide comprehensive understanding of one or more aspects for the purpose of explanation. However, it will also be appreciated by those having ordinary skill in the art that such aspect(s) may be carried out without the specific details. The following description and accompanying drawings will be set forth in detail for specific exemplary aspects among one or more aspects. However, these aspects are illustrative and some of various methods in the principles of the various aspects may be utilized, and the descriptions are intended to include all such aspects and their equivalents.

In addition, various aspects and features will be presented by a system that may include a plurality of devices, components and/or modules, etc. It will also be understood and appreciated that various systems may include additional devices, components, and/or modules, etc. and/or may not include all of the devices, components, modules, etc. discussed in connection with the drawings.

the terms "embodiment", "example", "aspect" or the like used herein may not be construed in that an aspect or design set forth herein is preferable or advantageous than other aspects or designs. The terms such as 'unit', 'component', 'module', 'system', and 'interface' used below generally refer to computer-related entities, and may refer to, for example, hardware, a combination of hardware and software, or software.

In addition, it will be understood that the terms "include" and/or "including" imply the presence of the corresponding features and/or components, but do not preclude the presence or addition of one or more other features, components and/or groups thereof.

In addition, The terms including an ordinal number such as first and second may be used to describe various components, however, these components are not limited by the above-mentioned terms. The terms are used only for the purpose of distinguishing one component from another component. For example, the first component may be named the second component, and similarly, the second component may also be named the first component, without departing from the scope of the present invention. The term "and/or" includes any one of a plurality of related listed items or a combination thereof.

In addition, in the embodiments of the present invention, unless otherwise defined, all terms used herein including technical or scientific terms have the same meaning as commonly understood by those having ordinary skill in the art. Terms defined in commonly used dictionaries will be interpreted as having a meaning consistent with their meaning in the context of the relevant technology, and will not be interpreted in an idealized or overly formal sense unless explicitly defined in the embodiments of the present invention.

Figure 1:
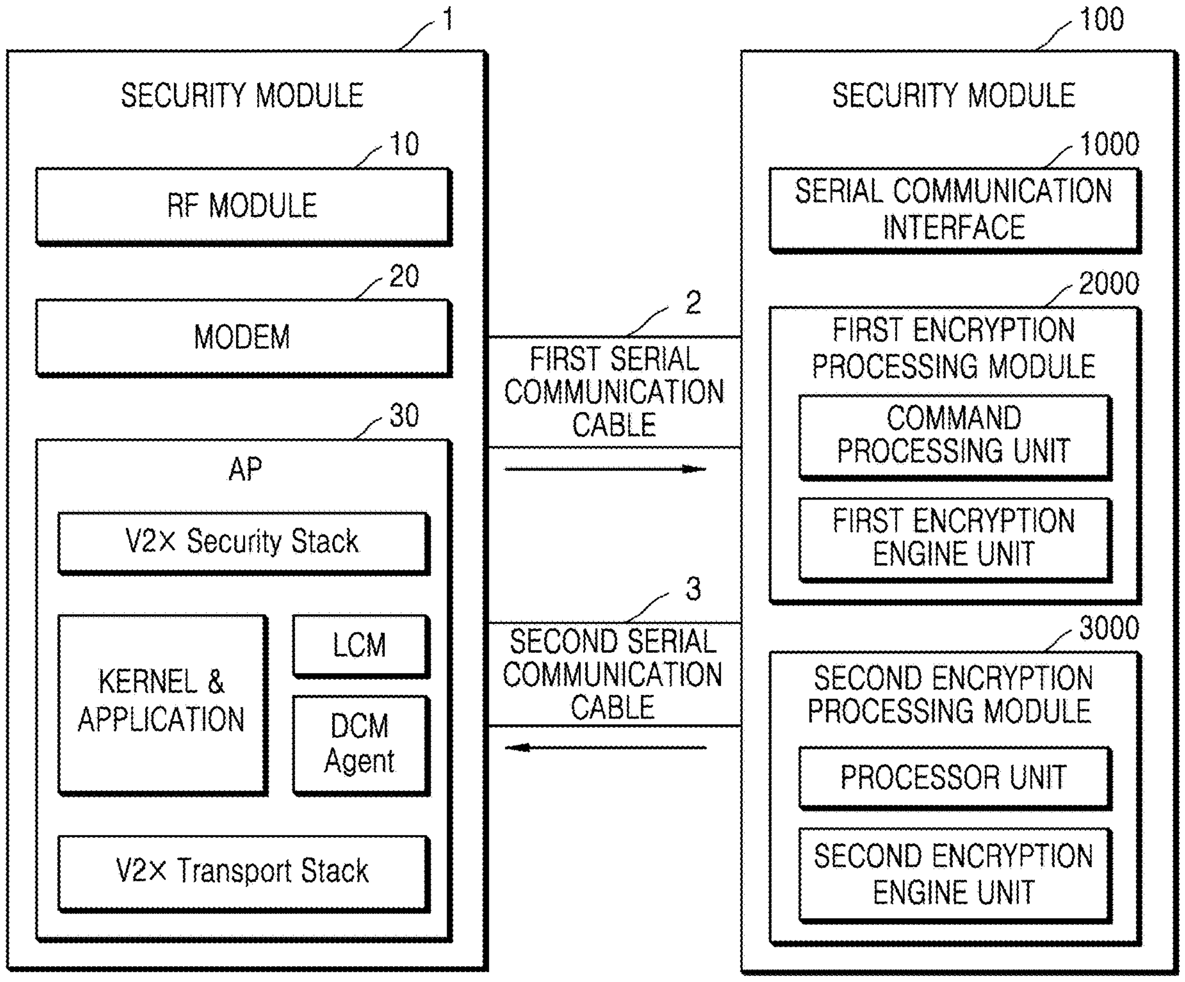
FIG. 1 schematically illustrates the configuration of a security terminal system capable of performing high-speed security processing according to one embodiment of the present invention.

FIG. 1 schematically illustrates the configuration of a security terminal system capable of performing high-speed security processing according to one embodiment of the present invention. As shown in FIG. 1, a security terminal system installed inside a vehicle to perform high-speed security processing required for V2X communication includes: an RF module 10 for performing wireless communication with an outside; a modem 20 for modulating/demodulating data to be transmitted and received through the RF module 10; an AP 30 connected to the modem 20 to process processes related to transmission and reception and security of the data used for the V2X communication; a first encryption processing module 2000 for performing a first security operation on a data packet received from the AP 30 through serial communication scheme to transmit the data packet to the AP 30; and a second encryption processing module 3000 including one or more processors and one or more memories and performing a second security operation that is not performed by the first encryption processing module 2000 on the received data packet, wherein the first encryption processing module 2000 includes: a first encryption engine unit 2200 including a plurality of encryption engines for performing the first security operation on the received data packet according to each encryption algorithm; and a command processing unit 2100 for interpreting a request received from the first encryption processing module 2000, inputting the request to a related encryption engine based on an interpretation result, and generating a response packet based on an execution result of the first security operation performed by the encryption engine, wherein the encryption engines and the command processing unit 2100 are implemented in hardware.

As a whole, the security terminal system capable of performing high-speed security processing according to the present invention includes a security terminal 1 and a security module 100, the security terminal 1 performs wireless communication with the outside, and as an exemplary embodiment, the security terminal system may be installed inside a vehicle and perform V2X communication with the outside in a wireless communication manner.

Specifically, the security terminal 1 includes an RF module 10 that performs wireless communication with the outside, and the RF module 10 performs one-to-many wireless communication with an external communication device through an antenna or the like. The external communication device may be a vehicle, a pedestrian, infrastructure, a network terminal or the like. The data received from the RF module 10 is transmitted to the AP 30 via the modem 20, and the AP 30 performs an operation corresponding to the data received from the corresponding security terminal 1.

Meanwhile, security-related matters among the operations performed in the AP 30 is generally performed through a separate security module 100 physically separated from the AP 30, and the security terminal 1 of the present invention is also connected to the security module 100 for security and performs security work on necessary data. The security work, as one embodiment of the present invention, may correspond to a security computation required by Federal Information Processing Standards of the United States (FIPS), correspond to a security computation required by V2X communication standards, or correspond to a computation related to a security-related protocol defined in IEEE1609. The security operation includes encryption and decryption computations of specific data, and in addition to the above-mentioned embodiment, may further include a process of encrypting/decrypting specific data, generating certificates for specific data, or storing specific data confidentially.

In other words, the AP 30 transmits a data packet requiring a security computation to the security module 100, and the security module 100 performs a security operation related thereto and then returns an execution result of the security computation to the AP 30.

Meanwhile, as mentioned in the Background of the Invention above, the security terminal 1 simultaneously performs one-to-many communication with hundreds to thousands of external communication devices, and is required to perform security processing for each communication. In order to perform the above simultaneous and multiple security processing, technologies in the related art focus on improving the performance of the security module 100. When the security module 100 is tested after improving the performance of the security module 100, the performance required by the client or communication standard is satisfied. However, when the security module 100 is connected to the security terminal 1, the entire security terminal system including the security terminal 1 and the security module 100 often fails to provide the service performance equivalent to the computational performance of the security module 100.

This is one of the causes of a bottleneck phenomenon occurring in data communication between the security module 100 and the security terminal 1. Software or the like for SPI communication processing, packet parsing, and return packet creation degrades the performance of the security module 100, and the installation of an individual encryption engine without cohesion in the security module 100 degrades the performance. For these reasons, even when a high-performance encryption engine is installed in the security module 100 to perform a security operation, the performed results cannot be quickly transmitted to the security terminal 1. According to the embodiments in the related art, when a security module 100 having an engine capable of performing 3000 computations per second is connected to a security terminal 1, the performance is only about 200 times per second. Accordingly, in order to solve the above conventional problem, the inventor of the present invention has designed the present invention for improving the communication structure between the security terminal 1 and the security module 100 and the internal structure of the security module 100 in the related art. Hereinafter, the technical features of the present invention will be described in detail.

As shown in FIG. 1, the security terminal 1 and the security module 100 of the present invention communicate with each other through a first serial communication cable 2 and a second serial communication cable 3 independent of the first serial communication cable 2. More specifically, the first serial communication cable 2 supports only communication in the direction from the security terminal 1 to the security module 100 (Rx communication in an aspect of the security module 100), and the second serial communication cable 3 only supports communication in the direction from the security module 100 to the security terminal 1 (Tx communication in an aspect of the security module 100). In the related art, it is a common practice for the security terminal 1 and the security module 100 to perform transmission and reception simultaneously on a single communication line. However, the above configuration may cause problems that exacerbate the above-mentioned bottleneck phenomenon. In other words, the first serial communication cable 2 and the second serial communication cable 3 of the present invention support only one-way communication so as to be responsible for inputting or outputting data packets, respectively, so that continuous asynchronous communication can be performed between the security terminal 1 and the security module 100, thereby reducing the above-mentioned bottleneck phenomenon.

The first serial communication cable 2 and the second serial communication cable 3 are connected to the serial communication interface 1000 of the security module 100, and the serial communication interface 1000 is connected to the first encryption processing module 2000 for performing a first security operation. In other words, the first encryption processing module 2000 may perform the first security operation on a data packet received through the serial communication interface 1000.

In addition, the first encryption processing module 2000 is connected to the second encryption processing module 3000. In other words, the data packet received through the serial communication interface 1000 may be transmitted to the second encryption processing module 3000 through the first encryption processing module 2000. the second encryption processing module 3000 may perform a second security operation on the data packet transmitted to the second encryption processing module 3000. The security module 100 will be described later in more detail.

Meanwhile, the serial communication used in the present invention may correspond to SPI communication as an exemplary embodiment, but is not limited thereto, and various types of known serial communication schemes may be employed.

Meanwhile, the internal configuration of the security terminal 1 of FIG. 1 shows only the minimum configuration for describing the technical features of the present invention, the actual present invention is not limited thereto as shown in FIG. 1, and it is desirable to add a separate configuration to implement the aforementioned technical features.

Figure 2:
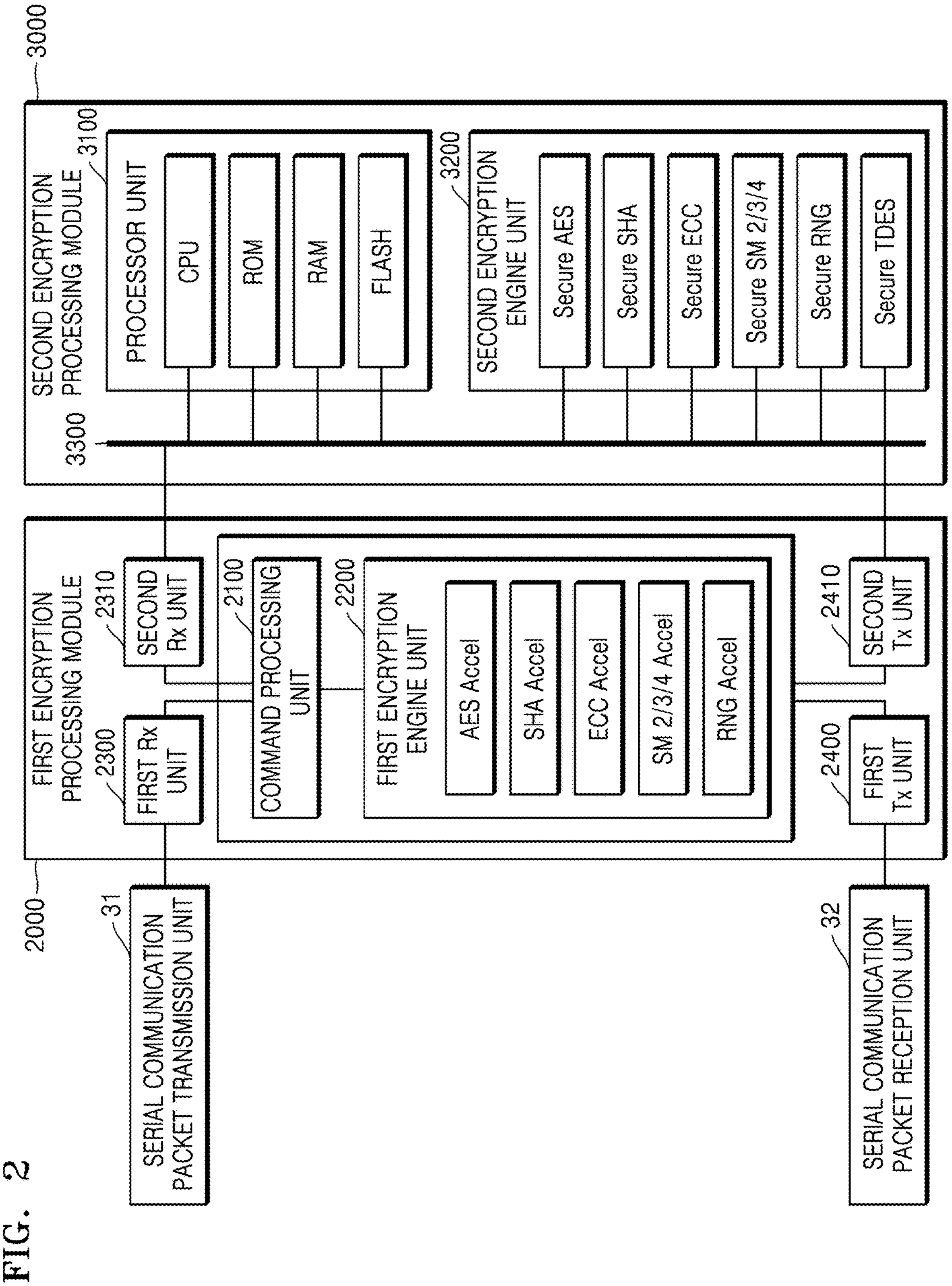
FIG. 2 schematically illustrates the internal configuration of a security module according to one embodiment of the present invention.

FIG. 2 schematically illustrates the internal configuration of a security module according to one embodiment of the present invention.

As shown in FIG. 2, the AP 30 includes: a serial communication input port 31 for transmitting a data packet to be performed through the first security operation or the second security operation to the first encryption processing module 2000; and a serial communication packet reception unit 32 for receiving a data packet having been performed through the first security operation or the second security operation from the first encryption processing module 2000, the first encryption processing module 2000 further includes: a first Rx unit 2300 for receiving the data packet to be performed through the first security operation from the serial communication input port 31 and transmitting the data packet to the command processing unit 2100; and a first Tx unit 2400 for receiving the data packet having been performed through the first security operation from the command processing unit 2100 and transmitting the data packet to the serial communication input port 31, the serial communication input port 31 and the first Rx unit 2300 communicate with each other through the first serial communication cable 2, in which the first serial communication cable 2 only supports communication in the direction from the AP 30 to the first encryption processing module 2000, and the serial communication packet reception unit 32 and the first Tx unit 2400 communicate with each other through the second serial communication cable 3, in which the second serial communication cable 3 only supports communication in the direction from the first encryption processing module 2000 to the AP 30.

In addition, the first encryption processing module 2000 further includes: a second Rx unit 2310 for receiving the data packet from a bus line of the second encryption processing module 3000 to transmit the received data packet to the command processing unit 2100; and a second Tx unit 2410 for receiving the data packet from the command processing unit 2100 to transmit the received data packet to the bus line of the second encryption processing module 3000, wherein the bus line directly communicates with the one or more processors, the one or more memories, and a plurality of second encryption engines of the second encryption processing module 3000.

In addition, the second encryption processing module 3000 further includes: a second encryption engine unit 3200 including a plurality of encryption engines for performing the second security operation on the received data packet according to each encryption algorithm.

As a whole, the first encryption processing module 2000 includes: a first encryption engine unit 2200 including a plurality of encryption engines for performing the first security operation on the received data packet according to each encryption algorithm; and a command processing unit 2100 for interpreting a request received from the first encryption processing module 2000, inputting the request to a related encryption engine based on an interpretation result, and generating a response packet based on an execution result of the first security operation performed by the encryption engine, and the second encryption processing module 3000 includes: a processor unit 3100 including one or more processors and one or more memories; and a second encryption engine unit 3200 including a plurality of second encryption engines performing the second security operation.

Specifically, the security terminal 1 may exchange data packets with the security module 100 through the serial communication input port 31 and the serial communication packet reception unit 32 of the AP 30. As one embodiment of the present invention, each of the serial communication input port 31 and the serial communication packet reception unit 32 may include connection ports to which the first serial communication cable 2 and the second serial communication cable 3 are connected; as another embodiment of the present invention, may include an interface for supporting serial communication between the AP 30 and the security module 100; and as still another embodiment of the present invention, may be construed as a concept that includes a communication module for performing serial communication in the AP 30.

The first serial communication cable 2 is connected to the serial communication input port 31, and the second serial communication cable 3 is connected to the serial communication packet reception unit 32. In addition, the first serial communication cable 2 is directly or indirectly connected to the first Rx unit 2300 of the first encryption processing module 2000, and the second serial communication cable 3 is directly or indirectly connected to the first Tx unit 2400 of the first encryption processing module 2000. In other words, the security module 100 supports two ports connected to the security terminal 1, so that the present invention can performs high-speed security processing through the serial communication cables connected to the two ports, respectively.

As shown in FIG. 2, the first encryption processing module 2000 may be disposed between the serial communication interface 1000 and the second encryption processing module 3000, and includes a command processing unit 2100; a first encryption engine unit 2200; two Rx units 2300 and 2310; and two Tx units 2400 and 2410.

The first Rx unit 2300 and the first Tx unit 2400 of the first encryption processing module 2000 are connected to the serial communication interface 1000, and more specifically, the data packet transmitted from the AP 30 through the serial communication input port 1100 is transmitted to the command processing unit 2100 through the first Rx unit 2300, and the data packet containing the result of the security operation is transmitted from the command processing unit 2100 to the AP 30 through the first Tx unit 2400 and the serial communication output port 1200.

When the data packet is transmitted to the command processing unit 2100 through the first Rx unit 2300, the command processing unit 2100 decodes and interprets the data packet, and inputs a corresponding request to the related first encryption engine based on the interpreted result. The first encryption processing module 2000 has a built-in first encryption engine unit 2200 including a plurality of encryption engines for performing the first security operation according to each algorithm, and each of the encryption engines is implemented in hardware. Referring to FIG. 2, the first encryption engines corresponds to 'AES Accel', 'SHA Accel', 'ECC Accel', 'SM2/3/4 Accel', 'RNG Accel', and the like, and the first encryption engine unit 2200 may further include another first encryption engine not shown in FIG. 2. As one embodiment of the present invention, the 'SHA Accel' engine includes an algorithm that verifies the integrity of data by implementing a cryptographic hash function, and may be utilized in various security applications such as data integrity verification, digital signature, and encryption protocol. In addition, as one embodiment of the present invention, the first encryption processing module 2000 may have a built-in processor such as MCAL or CDEC.

Referring to FIG. 2, the processor unit 3100 includes CPU; ROM; RAM; and FLASH MEMORY; and each component of the processor unit 3100 is directly connected to the bus line of the second encryption processing module 3000. In addition, the second encryption engine unit 3200 includes 'Secure AES', 'Secure SHA', 'Secure ECC', 'Secure SM2/3/4', 'Secure RNG', 'Secure TDES' and the like serving as the second encryption engine, and each of the second encryption engines is directly connected to the bus line. The second encryption engine unit 3200 may further include another second encryption engine not shown in FIG. 3. As one embodiment of the present invention, the 'Secure SES' engine refers to a module that implements the advanced encryption standard (AES) encryption algorithm, and may perform AES encryption and decryption operations, optimize the use of system resources while efficiently encrypting or decrypting data, and be used to protect data in security-critical applications.

Accordingly, the bus line connected to each component of the second encryption processing module 3000 is connected to the second Rx unit 2310 and the second Tx unit 2410 of the first encryption processing module 2000. According to one embodiment of the present invention, the second Rx unit 2310 and the second Tx unit 2410 may include a partial or entire configuration of a bus interface.

As described above, a data packet having not been performed through the security operation in the first encryption processing module 2000, that is, a data packet for which the security operation is designated by the AP 30 to be performed in the second encryption processing module 3000, may be performed through the security operation in the second encryption processing module 3000, and the second security operation may be performed by one or more encryption engines included in the second encryption engine unit 3200. When the execution result is output, the processor unit 3100 generates a response packet based on the execution result, and transmits a data packet including the generated response packet to the first encryption processing module 2000 through the bus line and the second Rx unit 2310. Thereafter, the first encryption processing module 2000 transmits the data packet received through the first Tx unit 2400 to the AP 30.

As shown in FIG. 2, the first encryption processing module 2000 of the present invention may perform data communication with the AP 30 more quickly through the first Rx unit 2300 and the first Tx unit 2400 connected to each of the two different serial communication cables 2 and 3 and independently arranged, and all of the first encryption engines are implemented in hardware and built into the first encryption processing module 2000, so that the security operation can be processed at high speed without inherent delays of software-implemented encryption engines, and the processed results can be quickly transmitted to the AP 30. When the encryption engine is implemented in hardware like the first encryption engine, all steps within the engine are allowed to operate simultaneously, so that low latency can be facilitated.

Meanwhile, when the command processing unit 2100 decodes the data packet input through the first Rx unit 2300 and the engine for performing the security operation on the data packet is not present in the first encryption processing module 2000, in other words, when the decoded data packet requires the security operation by the second encryption engine, the data packet is transmitted to the second encryption processing module 3000 through the second Tx unit 2410 without being transmitted to the first encryption engine unit 2200. Hereinafter, the relationship between the first encryption processing module 2000 and the second encryption processing module 3000 will be described later.

Meanwhile, the internal configuration of the security module 100 in FIG. 2 shows only the minimum configuration for describing the technical features of the present invention, the actual present invention is not limited thereto as shown in FIG. 2, and it is desirable to add a separate configuration to implement the aforementioned technical features.

Figure 3:
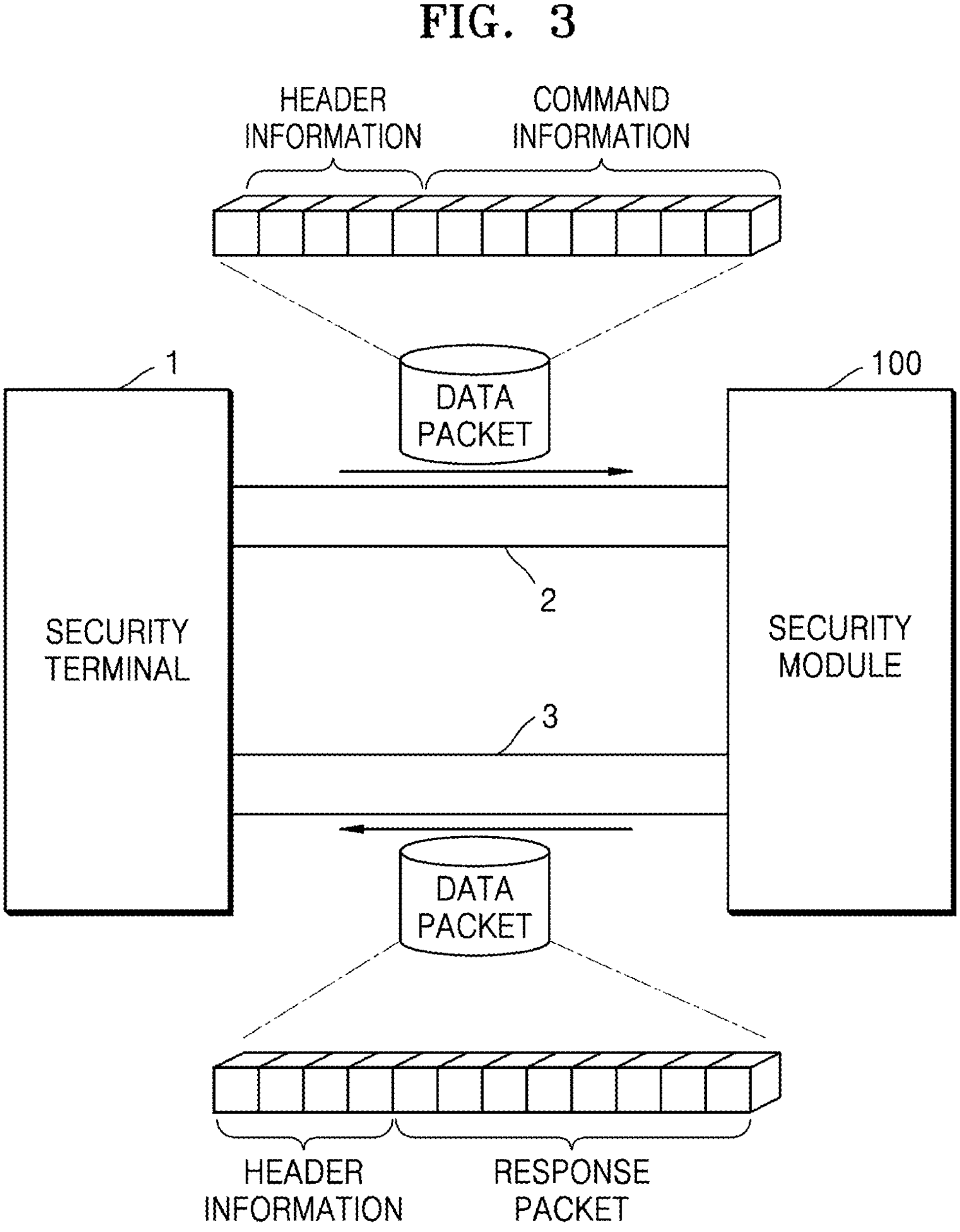
FIG. 3 schematically illustrates a process in which a security terminal and a security module communicate through two serial communication cables according to one embodiment of the present invention.

FIG. 3 schematically illustrates a process in which the security terminal 1 and the security module 100 communicate through two serial communication cables according to one embodiment of the present invention.

As shown in FIG. 3, the data packet transmitted from the AP 30 through the first serial communication cable 2 includes header information, payload information, and CRC information (the CRC information is not shown in FIG. 3), and the data packet transmitted to the AP 30 through the second serial communication cable 3 includes header information, payload information, and CRC information (the CRC information is not shown in FIG. 3).

Specifically, in one embodiment of the present invention, it is desirable that the data packet transmitted through the first serial communication cable 2 includes a plurality of command information, and since each command information has a different decoder area, the command processing unit 2100 may allocate an encryption engine according to each command information. For example, referring to FIG. 2, the 'AES Accel' engine of the first encryption engine unit 2200 may perform a security operation on a first command information of the data packet received by the command processing unit 2100, and the 'ECC Accel' engine of the first encryption engine unit 2200 may perform a security operation on a second command information of the data packet received by the command processing unit 2100.

Accordingly, when each encryption engine performs the security operation and derives the execution results, the command processing unit 2100 may generate the execution results of each security operation as a response packet, serially arrange the response packet in one data packet, and then transmit the data packet to the AP 30 through the second serial communication cable 3. According to one embodiment of the present invention, the response packet for each of the multiple command information included in one data packet input to the security module 100 is not necessarily output as one data packet.

In other words, because the time taken for the security operation performed by each encryption engine is different, the command processing unit 2100 may not list response packets in a sequence of the input command information and transmit the response packets to the AP 30, but may transmit the processing results to the AP 30 based on the sequence as being received from the encryption engine. The security terminal system of the present invention adopts the above-described communication scheme, so that the bottleneck phenomenon can be minimized and the security processing results can be transmitted to the AP 30 faster compared to the related art.

In addition, when the security terminal 1 and the security module 100 exchange data through one communication line in the related art, an output of a data packet is required to wait for a while during input of the data packet and an input of a data packet is required to wait for a while during output of the data packet. In other words, input and output of data cannot be performed simultaneously. When the amount of input/output data is small, it may be no problem using only one communication line. However, when the size of the input/output data increases or the number of times increases, a delay may occur. In response to the above delay phenomenon, the present invention uses two serial communication cables to enable simultaneous input and output of data packets and exhibit the effect of significantly reducing the delay time.

After the first security operation is performed by the one or more encryption engines included in the first encryption engine unit 2200, or the second security operation is performed by the one or more encryption engines included in the second encryption engine unit 3200, and when the execution result thereof is derived, the command processing unit 2100 generates a response packet based on the execution result, and transmits a data packet including the generated response packet to the AP 30 through the first Tx unit 2400. As one embodiment of the present invention, the data packet transmitted from the security module 100 may include a plurality of response packets, and the response packets may correspond to response packets for different command information, respectively.

Figure 4A:
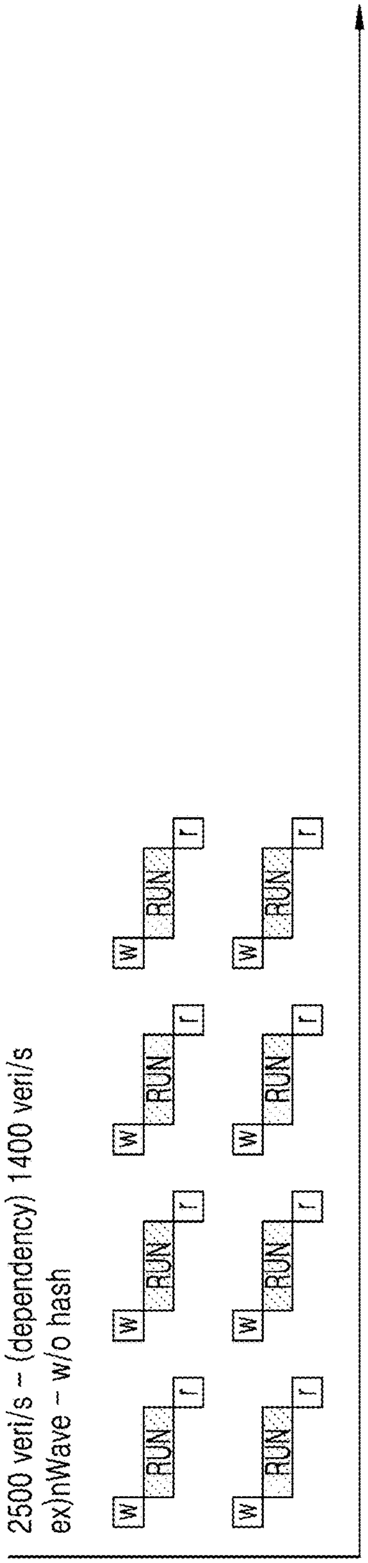
FIGS. 4A to 4C schematically illustrate a communication scheme of the related art and a communication scheme of the present invention in a communication scheme between the security terminal and the security module according to one embodiment of the present invention.
Figure 4B:
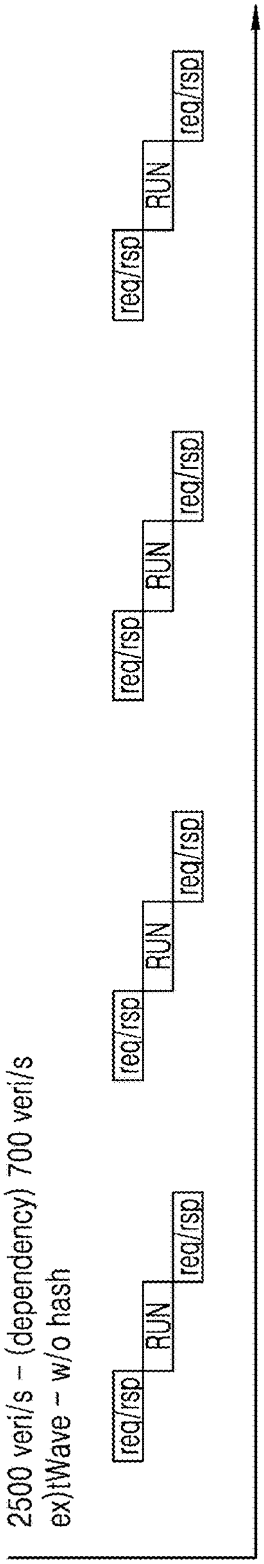
Figure 4C:
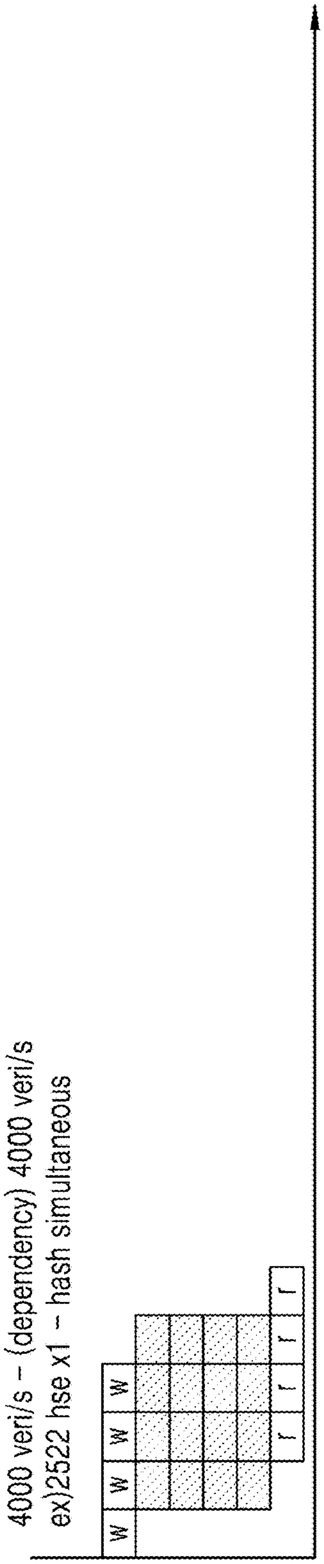

FIGS. 4A to 4C schematically illustrate a communication scheme of the related art and a communication scheme of the present invention in a communication scheme between the security terminal 1 and the security module 100 according to one embodiment of the present invention.

As a whole, FIG. 4A shows a scheme in which the security terminal 1 and the security module 100 communicate through a parallel interface in the related art, FIG. 4B shows a scheme in which the security terminal 1 and the security module 100 communicate through a serial interface in the related art, and FIG. 4C, as one embodiment of the present invention, shows a scheme the security terminal 1 and the security module 100 communicate through a serial communication interface in a full-duplex manner.

Specifically, the memory interface communication scheme in the related art shown in FIG. 4A is configured to repeatedly perform writing w, engine operation RUN, and reading r, and has the advantage of simultaneously processing multiple commands on multiple lines due to the use of parallel interface. However, recently, the number of data required to be processed simultaneously has become so large that there is a disadvantage in that too many lines are required to process data in the manner shown in FIG. 4A in modern communications.

The serial communication scheme in the related art shown in FIG. 4B is configured to communicate in a manner that a 4-byte request (req and request) is transmitted and then a 4-byte response (rsp and response) to the request is received; the engine is operated (run) when the response is received; and after the operation is finished, a 4-byte request (req) is transmitted again and a 4-byte response (rsp) to the request is received. In other words, the above communication scheme may allow the transmission and reception on a single communication line, but has the disadvantage in that a gap may be present between receptions the request and the response, and the engine may not be operated efficiently (the section between 'RUN' and 'RUN' in FIG. 4B in which the engine is not operated). Using a plurality of engines has been proposed to offset the disadvantage, however, this may cause expensive costs and inefficient layout designs.

The communication scheme of the present invention shown in FIG. 4C uses a serial communication, but implements asynchronous stream communication by using a full-duplex manner. Accordingly, write and read are consecutively received, so that the delay time of waiting for request (req)/response (rsp) can be eliminated, and multiple command information is packaged into a payload of a single data packet, so that communication efficiency and engine operation efficiency can be improved.

Figure 5:
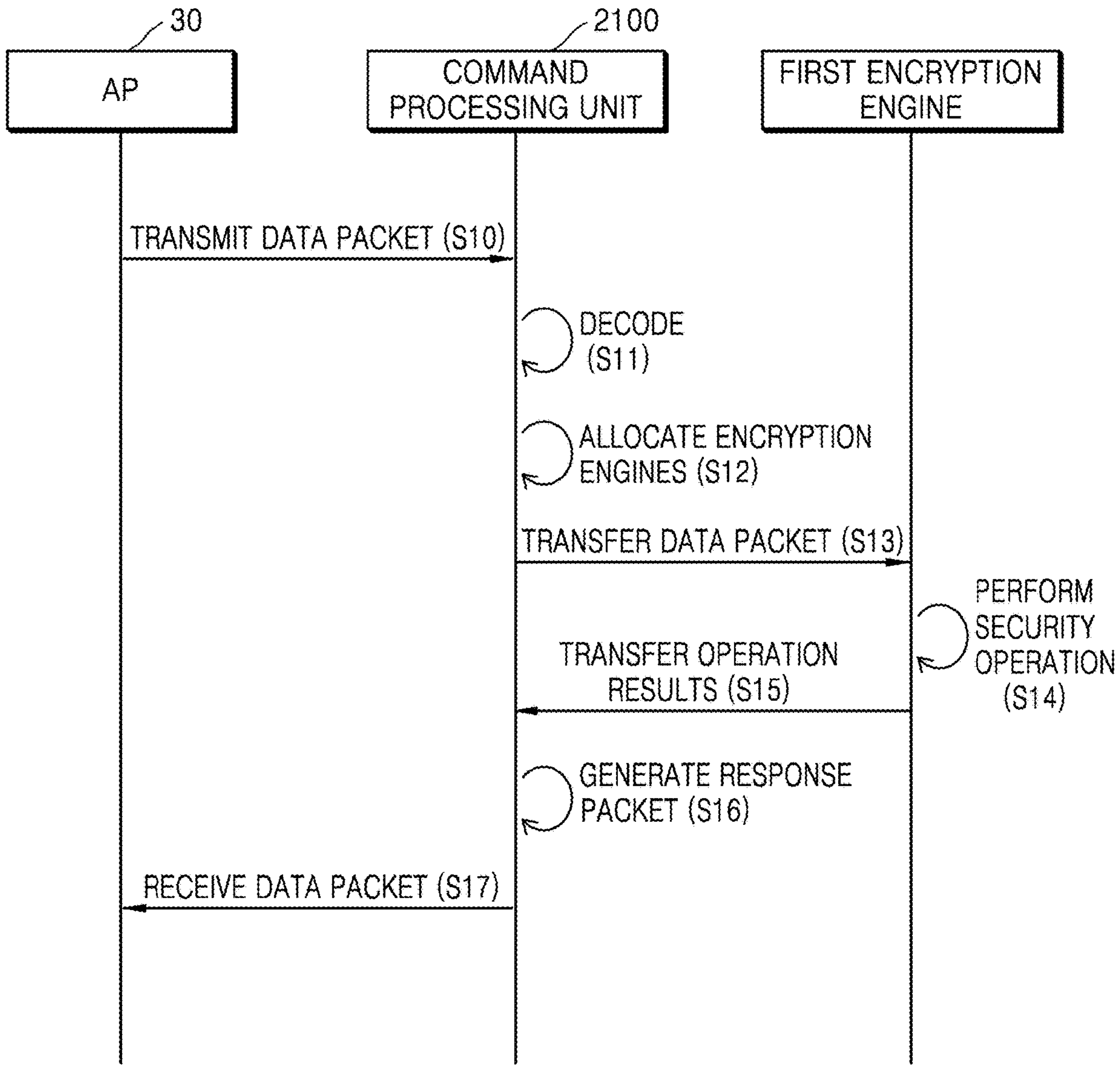
FIG. 5 schematically illustrates performing steps of a first security step according to one embodiment of the present invention.

FIG. 5 schematically illustrates performing steps of a first security step according to one embodiment of the present invention.

As shown in FIG. 5, the security terminal system performs a first security step, and the first security step includes: a step, in the AP 30, of transmitting a data packet to be performed through the first security operation to the first encryption processing module 2000 through a first serial communication cable 2; a step, in the command processing unit 2000, of receiving a data packet transmitted from the AP 30, decoding the received data packet, and then allocating encryption engines for performing the first security operation on the data packet based on a decoding result; a step, in the allocated encryption engine, of performing the first security operation on the data packet; and a step, in the command processing unit 2100, of receiving the data having been performed through the first security operation from the allocated encryption engine and transmitting the received data to the AP 30.

In addition, header information of the data packet transmitted from the AP 30 includes identification information for allowing the first security operation of the data packet to be performed in the first encryption processing module 2000, and the command processing unit 2100 that receives the data packet including the identification information performs the first security operation only in the first encryption processing module 2000 without transmitting the data packet to the second encryption processing module 3000.

Specifically, when a data packet is transmitted from the AP 30 to the first encryption processing module 2000 through the first serial communication cable 2 (S10), the command processing unit 2100 of the first encryption processing module 2000 decodes (S11) and interprets the data packet. The command processing unit 2100 determines the first encryption engine for performing a security operation on the corresponding command information based on the decoding result (S12), and the data packet, more specifically, the command information, is transmitted to the first encryption engine (S13). The first encryption engine receiving the command information performs the first security operation on the command information (S14), and the operation result is transmitted to the command processing unit 2100 (S15). The command processing unit 2100 generates a response packet based on the operation result (S16), and transmits a data packet including the response packet to the AP 30 through the second serial communication cable 3 (S17).

Meanwhile, the header information of the data packet received by the command processing unit 2100 from the AP 30 includes a 1-byte-sized Sync byte (see FIGS. 8A and 8B), and the Sync byte contains information on a destination of the data packet, that is, on whether the security operation of the data packet is required to be performed in the first encryption processing module 2000 or in the second encryption processing module 3000. For example, when the Sync byte is 0x3B, the destination of the data packet may be set to the first encryption processing module 2000, and when the Sync byte is 0x3F, the destination of the data packet may be set to the second encryption processing module 3000.

Figure 6:
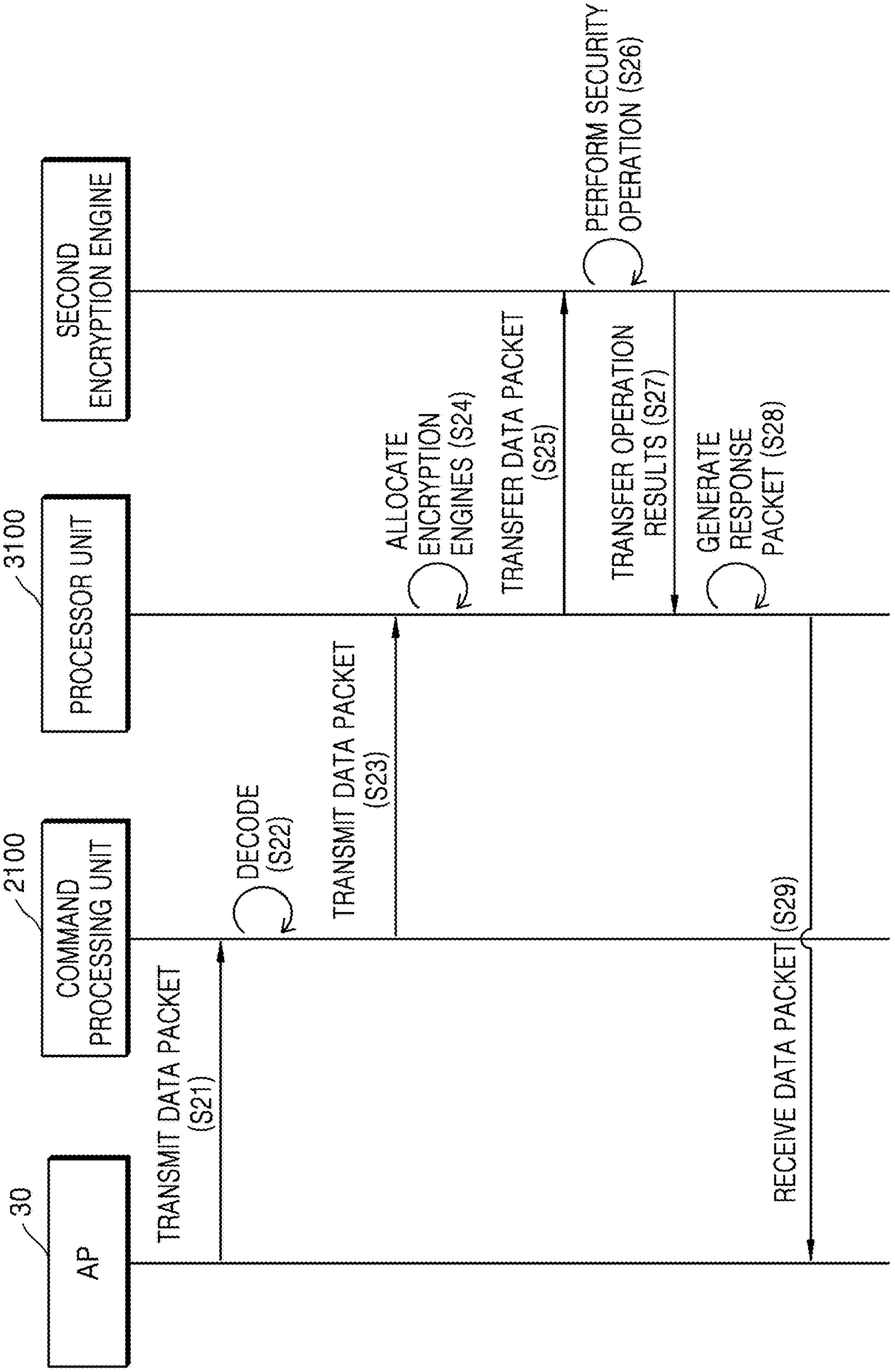
FIG. 6 schematically illustrates performing steps of a second security step according to one embodiment of the present invention.

FIG. 6 schematically illustrates performing steps of a second security step according to one embodiment of the present invention.

As shown in FIG. 6, the security terminal system performs a second security step, and the second security step includes: a step, in the AP 30, of transmitting the data packet to be performed through the second security operation to the first encryption processing module 2000 through the second serial communication cable 3; a step, in the command processing unit 2100, of transmitting the received data packet to the second encryption processing module 3000; a step, in the second encryption processing module 3000, of receiving a data packet, decoding the data packet received in a processor unit 3100 including one or more processors and one or more memories, and then allocating encryption engines for performing a second security operation on the data packet based on a decoding result; a step, in the allocated encryption engine, of performing the second security operation on the data packet; and a step, in the second encryption processing module 3000, of transmitting the data packet having been performed through the second security operation to the AP 30.

In addition, header information of the data packet transmitted from the AP 30 includes identification information for allowing the second security operation of the data packet to be performed in the second encryption processing module 3000, the command processing unit 2100 that receives the data packet including the identification information does not transmit the data packet to the first encryption engine unit 2200, and the second encryption processing module 3000 performs the second security operation on the data packet in a second encryption engine unit 3200 included in the second encryption processing module 3000.

Specifically, when the AP 30 transmits the data packet to the first encryption processing module 2000 through the first serial communication cable 2 (S10), the command processing unit 2100 of the first encryption processing module 2000 decodes (S22) and interprets the data packet. When the destination is set to the second encryption processing module 3000 in the Sync byte of the header information of the data packet, the command processing unit 2100 transmits the data packet to the second encryption processing module 3000 through the second Tx unit 2410 without transmitting the data packet to the first encryption engine (S23). The processor unit 3100 of the second encryption processing module 3000 receiving the data packet determines a second encryption engine suitable for the corresponding command information (S24), and transmits the command information to the determined encryption engine (S25).

The second encryption engine receiving the command information performs the second security operation on the command information (S26), and transmits an operation result to the processor unit 3100 (S27). As one embodiment of the present invention, the processor unit 3100 may generate a response packet based on the operation result (S28), and as another embodiment of the present invention, the processor unit 3100 may transmit the operation result to the command processing unit 2100, and the command processing unit 2100 may generate a response packet. The data packet including the response packet is transmitted to the AP 30 through the second serial communication cable 3 (S29).

Figure 7:
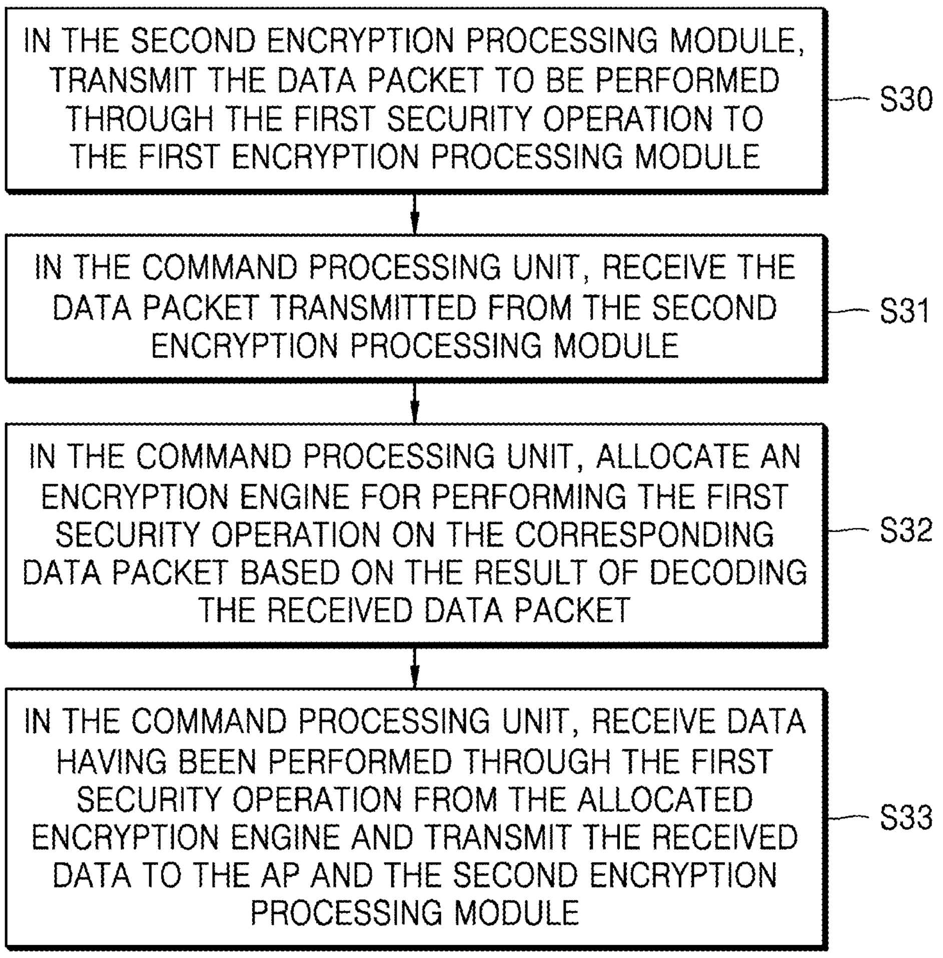
FIG. 7 schematically illustrates performing steps of a third security step according to one embodiment of the present invention.

FIG. 7 schematically illustrates performing steps of a third security step according to one embodiment of the present invention.

As shown in FIG. 7, the security terminal system performs a third security step, and the third security step includes: a step, in the second encryption processing module 3000, of transmitting a data packet to be performed through the first security operation to the first encryption processing module 2000; a step, in the command processing unit 2100, of receiving a data packet transmitted from the second encryption processing module 3000, decoding the received data packet, and then allocating encryption engines for performing the first security operation on the data packet based on a decoding result; a step, in the allocated encryption engine, of performing the first security operation on the data packet; and a step, in the command processing unit 2100, of receiving the data having been performed through the first security operation from the allocated encryption engine and transmitting the received data to the AP 30 and the second encryption processing module 3000.

Specifically, as one embodiment of the present invention, in the case for a quick code error check such as booting, the data packet may be transmitted from the second encryption processing module 3000 to the first encryption processing module 2000 without a request from the security terminal 1 (S30). In other words, when a security operation is requested from the second encryption processing module 3000 to the first encryption processing module 2000 (S30), the command processing unit 2100 of the first encryption processing module 2000 receives the data packet transmitted from the second encryption processing module 3000 (S31). Thereafter, the command processing unit 2100 determines the first encryption engine for performing a security operation on the corresponding command information based on the decoding result (S32), and the data packet, more specifically, the command information, is transmitted to the first encryption engine (S32). The first encryption engine receiving the command information performs the first security operation on the command information and transmits the operation result to the command processing unit 2100. The command processing unit 2100 generates a response packet based on the operation result and transmits a data packet including the response packet to the AP 30 through the second serial communication cable 3 (S33).

Figure 8A:
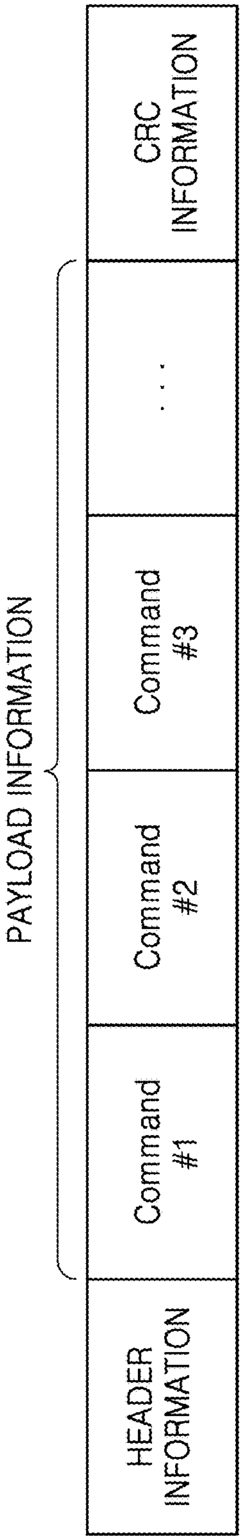
FIGS. 8A and 8B schematically illustrate a structure of a data packet communicated between the security terminal and the security module according to one embodiment of the present invention.
Figure 8B:
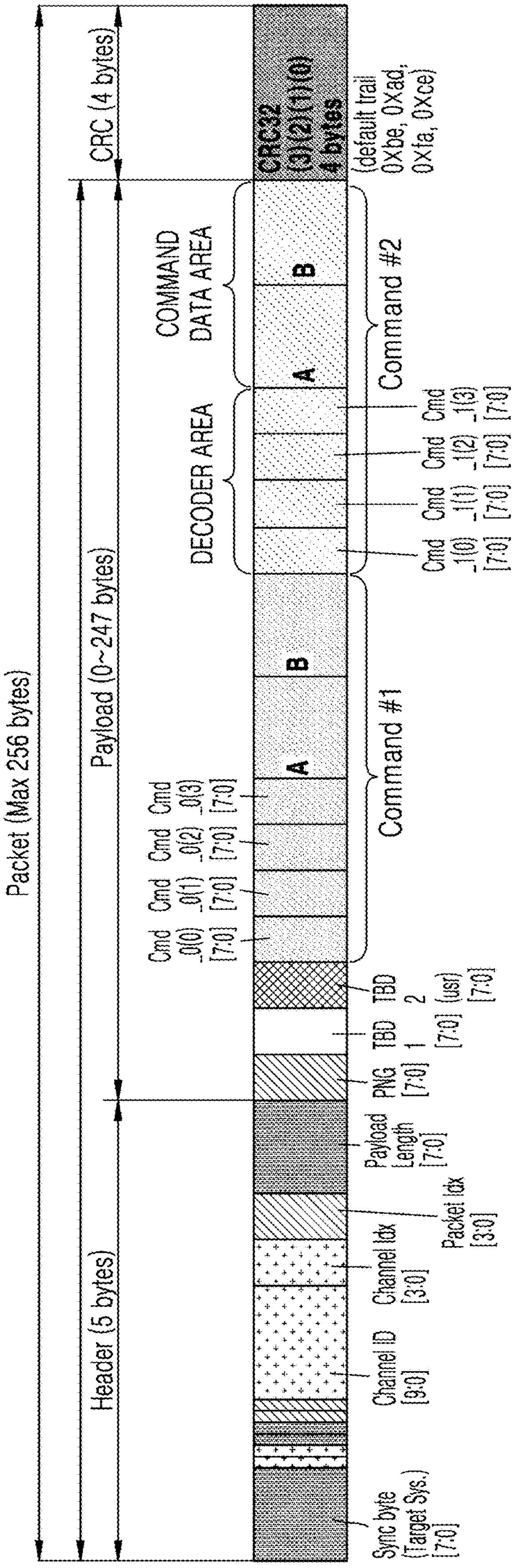

FIGS. 8A and 8B schematically illustrate a structure of a data packet communicated between the security terminal 1 and the security module 100 according to one embodiment of the present invention.

As shown in FIGS. 8A and 8B, the data packet received from the AP 30 includes header information, payload information, and CRC information, in which the payload information includes command information related to the security operation, and the header information includes: destination information related to a module for performing the security operation of the data packet; channel identification information related to a channel through which the data packet is communicated; and payload length information related to a length of a payload disposed after the header information.

In addition, each of the multiple command information includes: a decoder area having a size of 4 bytes and interpreted by the command processing unit 2100 of the first encryption processing module 2000; and a command data area related to information included in the decoder area, and the decoder area includes: repeated counts of a corresponding command; and a command index indicating a sequence of the command.

As a whole, FIG. 8A illustrates a structure of the data packet transmitted from the AP 30, and FIG. 8B illustrates in detail a structure of the data packet transmitted from the AP 30 as a representative embodiment of the present invention.

Specifically, as shown in FIG. 8A, the data packet transmitted from the AP 30 includes header information, payload information, and CRC information, and the payload information includes multiple different command information arranged serially. The above data packets are transmitted and received through the first serial communication cable 2, so that a large amount of command information can be quickly transmitted without a bottleneck phenomenon.

As shown in FIG. 8B, the data packet has a maximum size of 256 bytes, in which 5 bytes are allocated to the header information, 0 to 247 bytes to the payload information, and 4 bytes to the CRC information. The header information includes: destination information corresponding to the aforementioned Sync byte; channel identification information Channel ID related to a channel through which the data packet is communicated; and payload length information Payload Length related to a length of a payload disposed after the header information.

The destination information has a size of 1 byte, the channel identification information has a size of 10 bits (=1.25 bytes), and the payload length information has a size of 1 byte. Further, as one embodiment of the present invention, in addition to the destination information, the channel identification information and the payload length information, the header information may include various information such as encryption status designation information (Scramble Flag), encryption key designation information (Scramble Selection), CRC status designation information (CRC Flag), CRC and encryption order information (CRC Selection); priority packet status information (Priority Flag), information specifying whether to perform a payload command (Engine Flag), and packet issuance order information (Packet Index).

Referring to the above description, multiple command information Command #1, #2, . . . are disposed together in the payload information, in which a decoder area (described as Cmd in FIG. 8B) is allocated to a front end of each command information and a command data area (described as A and B in FIG. 8B) is allocated to a back end. The decoder area is composed of a total of 4 bytes, and the information stored in the decoder area varies depending on the specifications of the data packet. The decoder area includes the number of times the command is repeated (Cmd Idx, 4 bits) and the command index (Repeat Cnt, 4 bits) indicating a sequence of the command, and information disposed in other spaces of the decoder area may vary depending on the specifications of the data packet.

In the data packet, command coding and packet coding are designed to have no interdependence, and all input packets (data packets input from the AP 30 to the security module 100) generate return packets and are sent back to the AP 30. In addition, all 4-byte Cmds are recorded in the return packet, and a CDEC command group and a User Command group are distinguished. At this time, the User Command is defined by a user and is not processed by the command processing unit 2100.

According to one embodiment of the present invention, service performance loss occurring in data communication between the security terminal and the security module performing V2X communication may be minimized, so that high-speed response and security can be ensured.

According to one embodiment of the present invention, stream communication may be implemented, so that waiting delay for requests or responses can be eliminated.

According to one embodiment of the present invention, next-generation V2X communication standards can be satisfied.

According to one embodiment of the present invention, unnecessary high-performance engines or processors may not be used by increasing the efficiency of the security module, so that high service performance can be implemented at low cost.

According to one embodiment of the present invention, security processing may be performed at high speed, so that security for moving objects such as vehicles or pedestrians can be increased.

According to one embodiment of the present invention, continuous data communication may be performed by introducing dedicated Rx/Tx serial communication, so that data communication faster than the conventional SPI communication or serial communication technology can be facilitated.

Although the embodiments have been described above with limited embodiments and drawings, those skilled in the art will appreciate that various modifications and variations are available based on the above description. For example, appropriate results may be achieved even though the described techniques may be performed in an order different from the described manner, and/or the described components such as system, structure, device, and circuit may be coupled or combined in a form different from the described manner, or replaced or substituted by other components or equivalents.

Therefore, other implementations, other embodiments, and equivalents to the claims are also within the scope of the following claims.

What is claimed is:

1. A security terminal system installed inside a vehicle to perform high-speed security processing required for V2X (Vehicle to Everything) communication, the security terminal system comprising:

an RF (Radio Frequency) module configured to perform wireless communication with an outside;

a modem configured to modulate/demodulate data to be transmitted and received through the RF module;

an AP (Application Processor) connected to the modem to process processes related to transmission and reception and security of the data used for the V2X communication;

a first encryption processing module configured to perform a first security operation on a data packet received from the AP through a serial communication scheme to transmit the processed data packet to the AP; and a second encryption processing module including one or more processors and one or more memories and configured to perform a second security operation that is not performed by the first encryption processing module on the received data packet, wherein the first encryption processing module includes:

a first encryption engine unit including a plurality of encryption engines configured to perform the first security operation on the received data packet according to each encryption algorithm; and a command processing unit configured to interpret a request received at the first encryption processing module, input the request to a related encryption engine based on an interpretation result, and generate a response packet based on an execution result of the first security operation performed by the encryption engine, wherein the encryption engines and the command processing unit are implemented in hardware, and wherein the AP, the first encryption processing module, and the second encryption processing module are connected in series, and the AP and the first encryption processing module perform continuous asynchronous communication through:

a first serial communication cable supporting only unidirectional communication in a direction from the AP to the first encryption processing module; and a second serial communication cable that is independent of the first serial communication cable and supports only unidirectional communication in a direction from the first encryption processing module to the AP.

2. The security terminal system of claim 1, wherein the AP includes:

a serial communication packet transmission unit configured to transmit a data packet on which the first security operation or the second security operation is to be performed to the first encryption processing module; and a serial communication packet reception unit configured to receive a data packet on which the first security operation or the second security operation has been performed from the first encryption processing module, wherein the first encryption processing module further includes:

a first Rx unit configured to receive the data packet on which the first security operation is to be performed from the serial communication packet transmission unit and transmit the data packet to the command processing unit; and a first Tx unit configured to receive the data packet on which the first security operation has been performed from the command processing unit and transmit the data packet to the serial communication packet transmission unit, and wherein the serial communication packet transmission unit and the first Rx unit communicate through the first serial communication cable, and the serial communication packet reception unit and the first Tx unit communicate through the second serial communication cable.

3. The security terminal system of claim 1, wherein the first encryption processing module further includes:

a second Rx unit configured to receive the data packet from a bus line of the second encryption processing module to transmit the received data packet to the command processing unit; and a second Tx unit configured to receive the data packet from the command processing unit to transmit the received data packet to the bus line of the second encryption processing module, and wherein the bus line directly communicates with the one or more processors, the one or more memories, and a plurality of second encryption engines of the second encryption processing module.

4. The security terminal system of claim 1, wherein the security terminal system performs a first security step, and the first security step includes:

a step, in the AP, of transmitting a data packet on which the first security operation is to be performed to the first encryption processing module through a first serial communication cable;

a step, in the command processing unit, of receiving a data packet transmitted from the AP, decoding the received data packet, and then allocating an encryption engine for performing the first security operation on the data packet based on a decoding result;

a step, in the allocated encryption engine, of performing the first security operation on the data packet; and a step, in the command processing unit, of receiving the data on which the first security operation has been performed from the allocated encryption engine and transmitting the received data to the AP.

5. The security terminal system of claim 4, wherein header information of the data packet transmitted from the AP includes identification information for allowing the first security operation of the data packet to be performed in the first encryption processing module, and the command processing unit receiving the data packet including the identification information performs the first security operation only in the first encryption processing module, without transmitting the data packet to the second encryption processing module.

6. The security terminal system of claim 1, wherein the security terminal system performs a second security step, and the second security step includes:

a step, in the AP, of transmitting a data packet on which the second security operation is to be performed to the first encryption processing module through a second serial communication cable;

a step, in the command processing unit, of transmitting the received data packet to the second encryption processing module;

a step, in the second encryption processing module, of receiving a data packet, decoding the data packet received by a processor unit including one or more processors and one or more memories, and then allocating an encryption engine for performing a second security operation on the data packet based on a decoding result;

a step, in the allocated encryption engine, of performing the second security operation on the data packet; and a step, in the second encryption processing module, of transmitting the data packet on which the second security operation has been performed to the AP.

7. The security terminal system of claim 6, wherein header information of the data packet transmitted from the AP includes identification information for allowing the second security operation of the data packet to be performed in the second encryption processing module, the command processing unit that receives the data packet including the identification information does not transmit the data packet to the first encryption engine unit, and the second encryption processing module performs the second security operation on the data packet in a second encryption engine unit included in the second encryption processing module.

8. The security terminal system of claim 1, wherein the security terminal system performs a third security step, and the third security step includes:

a step, in the second encryption processing module, of transmitting a data packet on which the first security operation is to be performed to the first encryption processing module;

a step, in the command processing unit, of receiving a data packet transmitted from the second encryption processing module, decoding the received data packet, and then allocating an encryption engine for performing the first security operation on the data packet based on a decoding result;

a step, in the allocated encryption engine, of performing the first security operation on the data packet; and a step, in the command processing unit, of receiving the data on which the first security operation has been performed from the allocated encryption engine and transmitting the received data to the AP and the second encryption processing module.

9. The security terminal system of claim 1, wherein the second encryption processing module further includes:

a second encryption engine unit including a plurality of encryption engines configured to perform the second security operation on the received data packet according to each encryption algorithm.

* * * * *